United States Patent
Vltavsky

(10) Patent No.: US 11,570,573 B1
(45) Date of Patent: Jan. 31, 2023

(54) MULTI-CHANNEL GEO-FENCING SYSTEMS AND METHODS

(71) Applicant: Wells Fargo Bank, N.A., San Francisco, CA (US)

(72) Inventor: Dominik Vltavsky, Belmont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/563,912

(22) Filed: Dec. 28, 2021

Related U.S. Application Data

(63) Continuation of application No. 17/333,481, filed on May 28, 2021, now Pat. No. 11,272,317, which is a
(Continued)

(51) Int. Cl.
*H04W 4/021* (2018.01)
*G06Q 20/32* (2012.01)
(Continued)

(52) U.S. Cl.
CPC .......... *H04W 4/021* (2013.01); *G06Q 20/325* (2013.01); *G06Q 20/3221* (2013.01);
(Continued)

(58) Field of Classification Search
CPC .............. H04W 4/021; G06Q 20/3221; G06Q 20/3223; G06Q 20/3224; G06Q 20/325;
(Continued)

(56) References Cited

U.S. PATENT DOCUMENTS 6,386,323 B1  5/2002  Ramachandran et al.
6,760,046 B2  7/2004  I'Anson et al.
(Continued)

FOREIGN PATENT DOCUMENTS

EP   2 587 432        1/2013
WO   WO-2013/001133 A1  1/2013

OTHER PUBLICATIONS

"American Banker, Why Wintrust Financial is Testing Cardless ATM transactions, Jul. 2013, Source Media, vol. 178, 1-2" (Year: 2013).
(Continued)

*Primary Examiner* — Kabir A Timory
(74) *Attorney, Agent, or Firm* — Foley & Lardner LLP

(57) ABSTRACT

A method of remotely configuring a banking application based on a detected location of a computing device running the banking application, the method comprising: receiving a beacon identifier relating to a location of the computing device; determining the location of the computing device based on the beacon identifier; transmitting information about the determined location associated with a second authentication level that does not require authentication information; receiving authentication information relating to the user; authenticating the user to access a graphical user interface associated with the determined location based on the received authentication information; transmitting an authentication decision to the computing device; and displaying the graphical user interface instead of the information about the determined location.

20 Claims, 5 Drawing Sheets

Related U.S. Application Data continuation of application No. 16/709,577, filed on Dec. 10, 2019, now Pat. No. 11,026,043, which is a continuation of application No. 15/165,141, filed on May 26, 2016, now Pat. No. 10,560,799, which is a continuation of application No. 14/569,131, filed on Dec. 12, 2014, now Pat. No. 9,380,421.

(60) Provisional application No. 62/076,724, filed on Nov. 7, 2014.

(51) Int. Cl.
    *G06Q 40/02*     (2012.01)
    *G06Q 20/40*     (2012.01)

(52) U.S. Cl.
    CPC ..... *G06Q 20/3223* (2013.01); *G06Q 20/3224* (2013.01); *G06Q 20/405* (2013.01); *G06Q 20/4014* (2013.01); *G06Q 40/02* (2013.01)

(58) Field of Classification Search
    CPC ... G06Q 20/4014; G06Q 20/405; G06Q 40/02
    See application file for complete search history.

(56) References Cited

U.S. PATENT DOCUMENTS

| | | | |
|---|---|---|---|
| 7,669,757 | B1 | 3/2010 | Crews et al. |
| 8,086,519 | B2 | 12/2011 | Mylet et al. |
| 8,260,707 | B2 | 9/2012 | Treadwell et al. |
| 8,271,662 | B1 | 9/2012 | Gossweiler et al. |
| 8,295,898 | B2 | 10/2012 | Ashfield et al. |
| 8,438,066 | B1 | 5/2013 | Yuen et al. |
| 8,496,168 | B1 | 7/2013 | Miller et al. |
| 8,632,000 | B2 | 1/2014 | Laracey |
| 8,639,621 | B1 | 1/2014 | Ellis et al. |
| 8,924,292 | B1 | 12/2014 | Ellis et al. |
| 8,930,271 | B1 | 1/2015 | Ellis et al. |
| 9,002,272 | B2 | 4/2015 | Friedlaender |
| 9,033,217 | B2 | 5/2015 | Williams et al. |
| 9,117,242 | B1 | 8/2015 | Ellis et al. |
| 9,311,632 | B1 | 4/2016 | Dent |
| 9,380,421 | B1 | 6/2016 | Vltavsky |
| 9,384,486 | B2 | 7/2016 | Gurnani et al. |
| 9,519,934 | B2 * | 12/2016 | Calman .................. G06Q 40/02 |
| 10,373,148 | B1 | 8/2019 | Dixon et al. |
| 10,387,876 | B1 | 8/2019 | Buentello et al. |
| 2004/0153377 | A1 | 8/2004 | Dallman |
| 2004/0243515 | A1 | 12/2004 | Kurihara et al. |
| 2008/0052245 | A1 | 2/2008 | Love |
| 2008/0109375 | A1 | 5/2008 | Ricci et al. |
| 2008/0114697 | A1 | 5/2008 | Black et al. |
| 2009/0015374 | A1 | 1/2009 | Ghosh |
| 2010/0012484 | A1 | 1/2010 | Citti et al. |
| 2010/0205063 | A1 | 8/2010 | Mersky |
| 2011/0136429 | A1 | 6/2011 | Ames et al. |
| 2011/0161276 | A1 | 6/2011 | Krumm et al. |
| 2011/0202466 | A1 | 8/2011 | Carter |
| 2011/0238573 | A1 | 9/2011 | Varadarajan |
| 2011/0314153 | A1 | 12/2011 | Bathiche et al. |
| 2012/0127308 | A1 | 5/2012 | Eldershaw et al. |
| 2012/0196586 | A1 | 8/2012 | Grigg et al. |
| 2012/0209773 | A1 | 8/2012 | Ranganathan |
| 2012/0253913 | A1 | 10/2012 | Richard |
| 2012/0271883 | A1 | 10/2012 | Montoya et al. |
| 2013/0005253 | A1 | 1/2013 | Grigg et al. |
| 2013/0124411 | A1 | 5/2013 | Kobres et al. |
| 2013/0238497 | A1 | 9/2013 | Ramachandran et al. |
| 2013/0281017 | A1 | 10/2013 | Bondesen et al. |
| 2013/0282283 | A1 | 10/2013 | Bondesen et al. |
| 2014/0019336 | A1 | 1/2014 | Browne et al. |
| 2014/0040138 | A1 | 2/2014 | Henry |
| 2014/0040139 | A1 | 2/2014 | Brudnicki et al. |
| 2014/0089188 | A1 | 3/2014 | Rao |
| 2014/0279490 | A1 | 9/2014 | Calman et al. |
| 2014/0279491 | A1 | 9/2014 | Martin et al. |
| 2015/0026057 | A1 | 1/2015 | Calman et al. |
| 2015/0058224 | A1 | 2/2015 | Gaddam et al. |
| 2015/0254655 | A1 | 9/2015 | Bondesen et al. |
| 2015/0287017 | A1 | 10/2015 | Iqbal et al. |
| 2015/0287018 | A1 | 10/2015 | Iqbal et al. |
| 2015/0294296 | A1 | 10/2015 | Koeppel et al. |
| 2016/0012403 | A1 | 1/2016 | Kursun et al. |
| 2016/0012412 | A1 | 1/2016 | Scanlon et al. |
| 2016/0012505 | A1 | 1/2016 | Hanson et al. |
| 2016/0012527 | A1 | 1/2016 | Hanson |
| 2016/0014552 | A1 | 1/2016 | Hanson et al. |
| 2016/0014553 | A1 | 1/2016 | Cardinal et al. |
| 2016/0162855 | A1 | 6/2016 | Johnson et al. |
| 2016/0321627 | A1 | 11/2016 | McCracken et al. |
| 2017/0018001 | A1 | 1/2017 | Tunnell et al. |
| 2018/0018704 | A1 | 1/2018 | Tunnell et al. |
| 2018/0302414 | A1 | 10/2018 | Wagner |
| 2019/0034915 | A1 | 1/2019 | Van Wiemeersch et al. |

OTHER PUBLICATIONS

"NCR Mobile Casn Witnarawai Lets consumers pre-stage Casn Transactions using Their Mobile Banking App and Complete the Withdrawal by Scanning a 2D Barcode on Their Bank's ATM. The Transaction at the ATM Can Take Less Than 10 Seconds", The Street, Jun. 11, 2012, 2 pages.

Bernier, Paula, "Ellerman Sees Security, Intersection of e-Commerce and Mobile Marketing as Leading Trends", Mobile Commerce Insider, Dec. 4, 2013, 2 pages.

Friedlin, Ashley "Six Trends in Advertising You Need to Know for 2014", MarketingWeek, Jan. 17, 2014, 3 pages.

Srivatsa et al., "RFID & Mobile Fusion for Authenticated ATM Transaction", International Journal of Computer Applications (0975-0887), vol. 3—No. 5, Jun. 2010. 6 pages.

\* cited by examiner

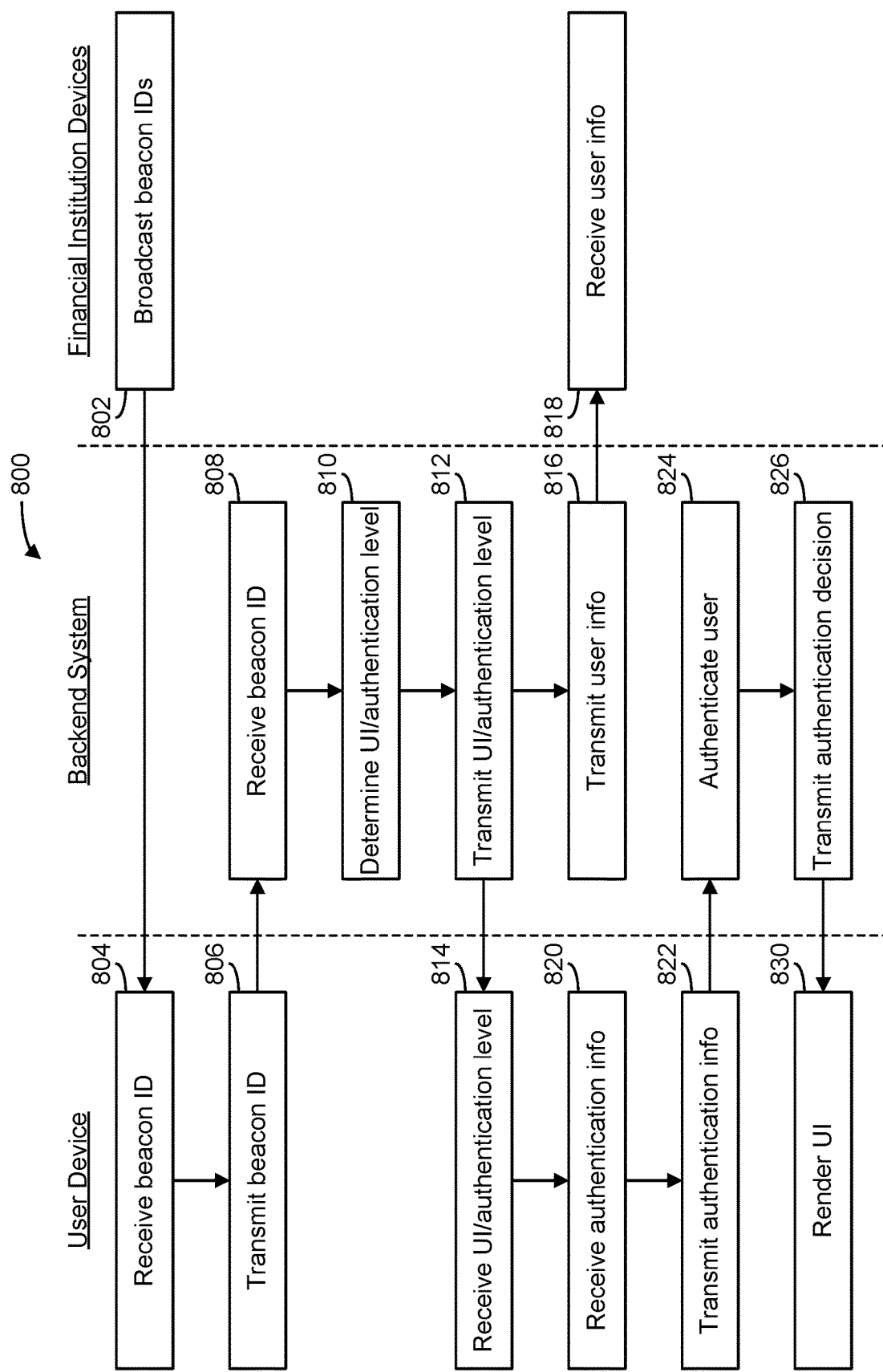

MULTI-CHANNEL GEO-FENCING SYSTEMS AND METHODS

CROSS-REFERENCE TO RELATED PATENT APPLICATIONS

This application is a continuation of and claims priority to U.S. patent application Ser. No. 17/333,481, entitled "MULTI-CHANNEL GEO-FENCING SYSTEMS AND METHODS," filed May 28, 2021, which is a continuation of and claims priority to U.S. patent application Ser. No. 16/709,577, entitled "MULTI-CHANNEL GEO-FENCING SYSTEMS AND METHODS," filed on Dec. 10, 2019, which is a continuation of U.S. patent application Ser. No. 15/165,141, entitled "MULTI-CHANNEL GEO-FENCING SYSTEMS AND METHODS," filed on May 26, 2016, which is a continuation of U.S. patent application Ser. No. 14/569,131, entitled "MULTI-CHANNEL GEO-FENCING AND SYSTEMS AND METHODS", filed on Dec. 12, 2014, which claims the benefit of and priority to U.S. Provisional Patent Application No. 62/076,724, filed Nov. 7, 2014, the contents of which are incorporated herein by reference in their entireties and for all purposes.

BACKGROUND

Generally, computing applications, such as smart phone applications, can be tailored to present different interfaces and information to users for different purposes. The different interfaces and information may relate to different services offered by a business. For example, a banking application may present different interfaces depending on the desired banking service the customer is accessing via the banking application. The banking application may present a first interface for viewing account balances, a second interface for locating the nearest ATMs or branches, a third interface for executing transfers between accounts, a fourth interface for paying bills, and so on. To switch between the interfaces, the customer selects the desired service through the user interface and the requested interface is loaded (e.g., by interacting with a graphical user interface presented on a touchscreen display).

SUMMARY

One embodiment relates to a method of remotely configuring a banking application based on a detected location of a computing device running the banking application. The method includes receiving, by a processor of a banking system, a first beacon identifier relating to a first location of the computing device. The method further includes determining, by the processor, the first location of the computing device based on the first beacon identifier, the first beacon identifier associated with a first determined location of a plurality of locations, wherein each of the plurality of locations is associated with an associated graphical user interface. The method includes transmitting, by the processor, a first graphical user interface associated with the determined location. The method further includes receiving, by the processor, authentication information relating to a user of the computing device. The method includes authenticating, by the processor, the user to access the first graphical user interface based on the received authentication information. The method further includes transmitting, by the processor, an authentication decision to the computing device, the authentication decision instructs the computing device that the user is permitted to access the first user interface.

Another embodiment relates to a banking system. The banking system includes a first beacon configured to transmit a first beacon identifier, the first beacon identifier transmitted at a first broadcast radius, the first broadcast radius geo-fencing a first area of a physical location. The banking system further includes a backend system comprising a processor and a memory. The backend system is configured to receive the first beacon identifier from a computing device. The backend system is further configured to determine a first device location of the computing device to be the first area of the physical location based on the first beacon identifier. The backend system is configured to transmit a first graphical user interface associated with the first area of the physical location. The backend system is further configured to receive authentication information relating to a user of the computing device. The backend system is configured to authenticate the user to access the first graphical user interface based on the received authentication information. The backend system is further configured to transmit an authentication decision to the computing device, the authentication decision instructs the computing device that the user is permitted to access the first user interface.

Yet another embodiment relates to a non-transitory computer readable media having computer-executable instructions embodied therein that, when executed by a processor of a backend banking system, cause the backend banking system to perform a banking method. The media includes computer-executable instructions that cause the backend system to receive a first beacon identifier relating to a first location of the computing device. The media further includes computer-executable instructions that cause the backend system to determine the first location of the computing device based on the first beacon identifier, the first beacon identifier associated with a first determined location of a plurality of locations, wherein each of the plurality of locations is associated with an associated graphical user interface. The media includes computer-executable instructions that cause the backend system to transmit a first graphical user interface associated with the determined location. The media further includes computer-executable instructions that cause the backend system to receive authentication information relating to a user of the computing device. The media includes computer-executable instructions that cause the backend system to authenticate the user to access the first graphical user interface based on the received authentication information. The media further includes computer-executable instructions that cause the backend system to transmit an authentication decision to the computing device, the authentication decision instructs the computing device that the user is permitted to access the first user interface.

These and other features, together with the organization and manner of operation thereof, will become apparent from the following detailed description when taken in conjunction with the accompanying drawings.

BRIEF DESCRIPTION OF THE FIGURES

FIG. 8 is a flow diagram of a method of updating an application interface based on a detected location of a user device within a geo-fenced area of a financial institution according to an exemplary embodiment.

DETAILED DESCRIPTION

Referring to the figures generally, systems and methods of adjusting computing device applications, such as smartphone applications, based on external beacon identifiers are described. Based on the identifier of the beacon detected by the smartphone, the smartphone application communicates with a backend server to receive location-specific information based on the identifier of the detected beacon. The location-specific information includes a location-specific user interface. In some arrangements, the location-specific user interface includes a designated user authentication level that varies from other location-specific user interfaces.

Figure 1:
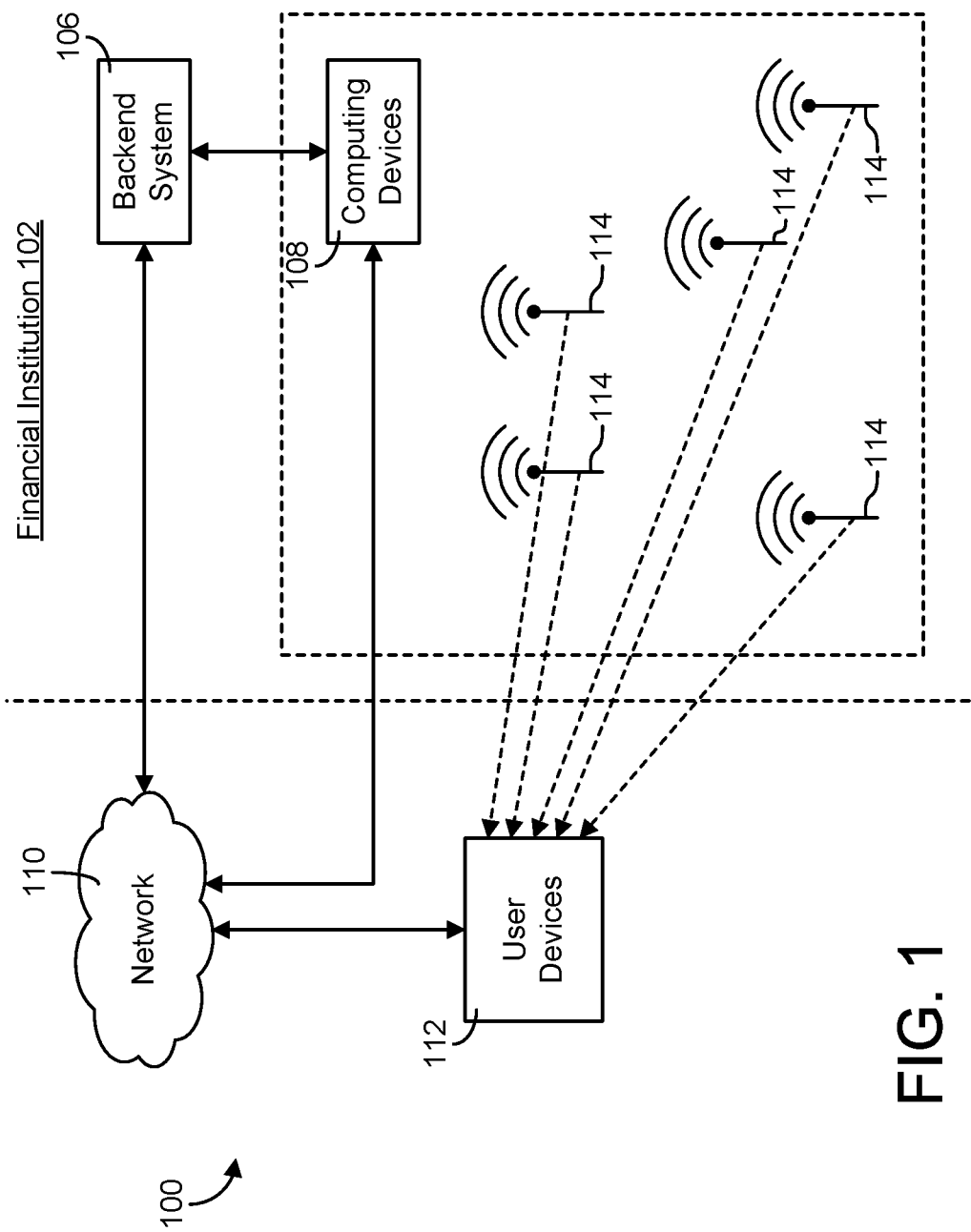
FIG. 1 is a block diagram of a computing system for a financial institution according to an exemplary embodiment.

Referring to FIG. 1, a block diagram of a computing system 100 for a financial institution 102 is shown according to an exemplary embodiment. The financial institution 102 includes a physical location 104 that can be visited by customers. In some arrangements, the physical location 104 is a branch for the financial institution 102. The branch may include teller windows, ATMs, drive-through banking lanes, and the like. In other arrangements, the physical location 104 is an ATM or a bank of ATMs (e.g., at a mall, on the street, at an airport, etc.). The financial institution 102 provides banking services to a plurality of customers via the physical location 104. The financial institution 102 includes a backend system 106. The backend system 106 maintains databases, such as customer account information, for the financial institution 102.

The physical location 104 includes any number of computing devices 108. The backend system 106 communicates with the computing devices 108 of the physical location 104. The computing devices 108 are used by employees of the financial institution 102 in providing financial services to customers. The backend system 106 communicates with the computing devices 108 via an internal network or indirectly via an external network 110 (e.g., the internet). The computing devices 108 include any of desktop computers, laptop computers, tablet computers, PDAs, and the like.

Still referring to FIG. 1, customers of the financial institution 102 can access the various services provided by the financial institution 102 through user devices 112. The user devices 112 include personal computing devices such as desktops, laptops, tablet computers, PDAs, smartphones, portable media devices, and the like. The user devices 112 communicate with the backend system 106 of the financial institution through the network 110. The user devices 112 may execute an application (e.g., a smartphone application) that is specific to the financial institution 102 or access a website of the financial institution 102 maintained by the backend system 106. Via the application or the website, the customer can access various information about his or her accounts with the financial instruction 102 (e.g., balances, interest rates, etc.), pay bills, view ATM and branch locations, and view additional services offered by the financial institution 102.

In some arrangements, a user device 112 is a portable device, such as a smartphone or a tablet computer. In such arrangements, the customer may visit the physical location 104 with the user device 112. Depending on the purpose of the customer's visit to the physical location 104, the customer may need to access a service specific interface of the application being executed on the user device 112. For example, if the purpose of the visit is to withdraw cash from an ATM, the customer may be able to prestage the ATM transaction through an ATM user interface of the application. If the purpose of the visit is to make a deposit with a teller of the bank, the customer may be able to prestage the teller transaction through a teller user interface of the application. The financial institution 102 is able to predict the user interface most applicable to the customer's destination based on the location of the user device 112. Accordingly, the backend system 106 pushes the necessary user interface and authentication level to the user device 112 as described in further detail below.

The physical location 104 of the financial institution 102 includes a plurality of locator beacons 114. Each beacon 114 broadcasts a unique beacon identifier within a limited range of the beacon 114. In some arrangements, the beacons 114 are Bluetooth® Low Energy beacons (e.g., iBeacons®). The limited range of the beacon may have a maximum broadcast range of approximately 10 meters. The maximum broadcast range may be increased or decreased by respectively increasing or decreasing the broadcast power of each beacon 114. Each beacon 114 is positioned within a specific location of the physical location. For example, a first beacon may be positioned near an ATM, a second beacon may be positioned within a lobby of the physical location 104, a third beacon may be positioned near a drive-through banking station of the physical location 104, a fifth beacon may be positioned near an entrance to the physical location 104, and so on. In some arrangements, each location associated with the physical location 104 includes a plurality of beacons 114 (e.g., a plurality of beacons 114 that geo-fence a large area, a plurality of beacons that designate sub-areas within a single area, such as individual drive-through lanes, etc.).

Each beacon 114 geo-fences the associated location by broadcasting the unique identifier such that a location aware device (e.g., the user device 112) knows it is in a certain location based on the determined unique identifier. As described in further detail below, when a customer brings a user device 112 capable of receiving signals from the beacons 114, an interface of the application being executed on the user device 112 can be customized with location-specific information depending on the detected beacon identifiers. Additionally, security requirements (e.g., the amount of login information required from the customer to access account information) may be altered depending on the detected beacon identifiers. In some arrangements, the backend system 106 maintains a database of beacon identifiers and associated locations. Each entry in the database includes a beacon identifier (e.g., a serial number that is broadcast from the beacon) and an associated location (e.g., an identifier of the physical location and an identifier of the placement within or outside of the physical location).

Figure 2:
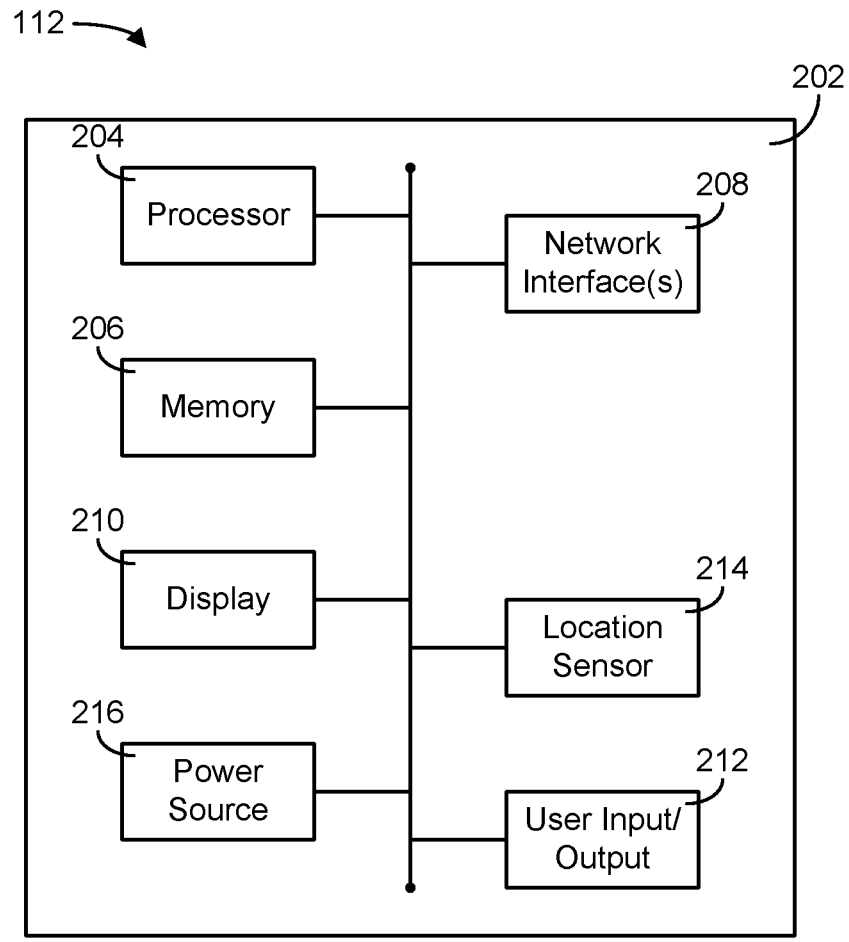
FIG. 2 is a block diagram of the user device according to an exemplary embodiment.

Referring to FIG. 2, a block diagram of the user device 112 is shown according to an exemplary embodiment. As discussed above, the user device 112 is a personal computing device (e.g., a desktop, laptop, tablet computer, PDA, smartphone, portable media device, or the like). The user device 112 includes a housing 202. The housing 202 is coupled to the various electrical components of the user device 112. The user device 112 includes a processor 204 and memory 206. The memory 206 includes program modules that, when executed by the processor 204, control the operation of the user device 112. The memory 206 may also store various applications, such as an application of the financial institution 102 that facilitates communication between the user device 112 and the various computing systems of the financial institution 102. The memory 204 may include any combination of RAM, ROM, NVRAM, or the like.

The user device 112 includes at least one network interface 208. The network interface 208 is a wireless network interface. The wireless network interface 208 includes any of a cellular transceiver (e.g., CDMA, GSM, LTE, etc.), a wireless network transceiver (e.g., 802.11X, ZigBee, Bluetooth, etc.), or a combination thereof (e.g., both a cellular transceiver and a Bluetooth transceiver). The network interface 208 is capable of receiving radio frequency transmissions from the beacons 114. Additionally, the network interface 208 is capable of communicating with the backend system 106 of the financial institution 102 via the network 110 (e.g., the Internet as accessed through a cellular data network).

The user device 112 includes a display 210 and a user input/output 212. In some arrangements, the display 210 and the user input/output are combined (e.g., as a touchscreen display device). In other arrangements, the display 210 and the user input/output 212 are discrete devices. The user input/output 212 includes any of speakers, keyboards, notification LEDs, microphones, biometric sensors (e.g., fingerprint scanners), buttons, switches, cameras, or a combination thereof.

In some arrangements, the user device 112 includes a location sensor 214. The location sensor 214 may be used to supplement location information determined based on the received beacon identifiers.

The user device 112 includes a power source 216. The power source 216 may include any combination of grid power and battery power (e.g., alkaline batteries, rechargeable batteries, etc.). In arrangements where the power source 216 is a rechargeable battery, the user device 112 also includes the necessary circuitry to recharge the battery.

Figure 3:
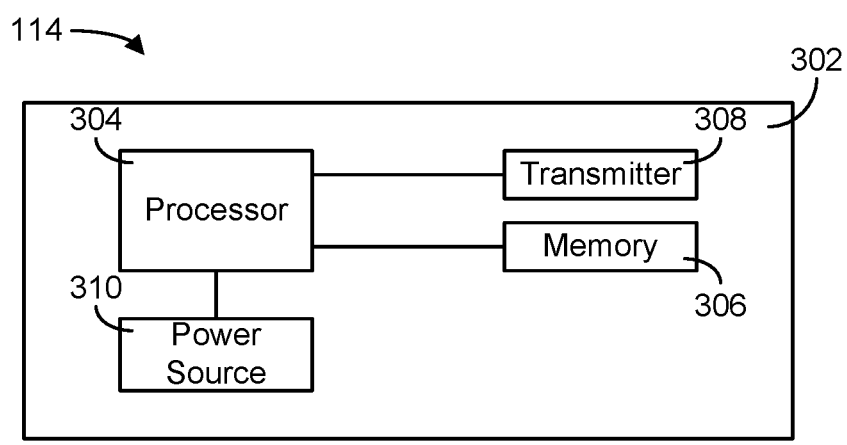
FIG. 3 is a block diagram of a beacon according to an exemplary embodiment.

Referring to FIG. 3, a block diagram of a beacon 114 is shown according to an exemplary embodiment. The beacon 114 includes a housing 302 that is coupled to various electrical components. The beacon 114 includes a processor 304 and memory 306. The memory 306 includes program modules that, when executed by the processor 304, control the operation of the beacon 114. The memory 304 may include any combination of RAM, ROM, NVRAM, or the like. The unique beacon identifier of the beacon 114 is programmed into the memory. The beacon 114 includes a radio frequency transmitter 308. The transmitter 308 may be a Bluetooth® transmitter 308. In some arrangements, the transmitter 308 is a transceiver capable of sending and receiving radio frequency transmissions. The beacon 114 includes a power source 310. The power source 310 may include any combination of grid power and battery power (e.g., alkaline batteries, rechargeable batteries, etc.). In some arrangements where the power source 310 is a battery, the beacon 114 is capable of transmitting the unique beacon identifier for at least a year without replacing or recharging the battery.

Figure 4:
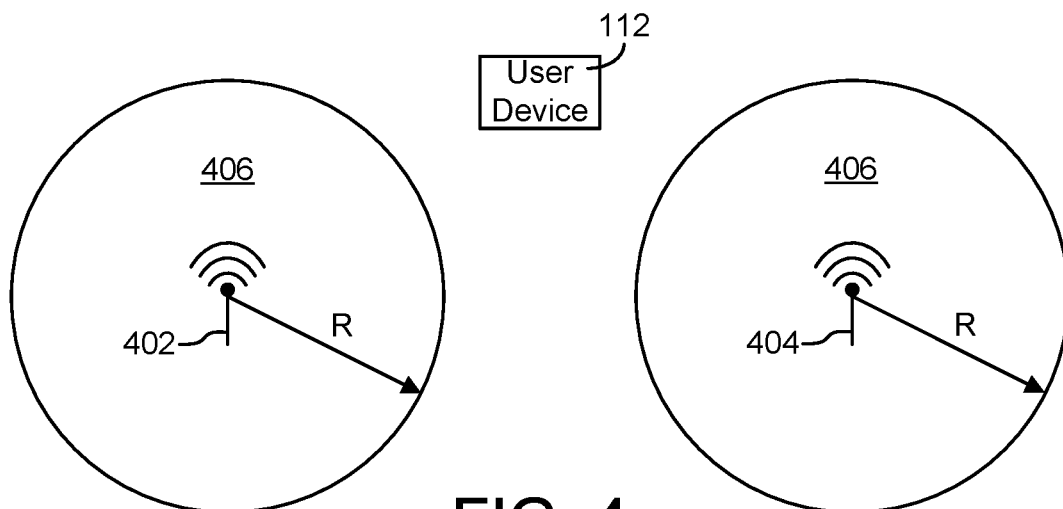
FIGS. 4 through 6 are diagrams of three different scenarios involving two locator beacons and a user device.
Figure 5:
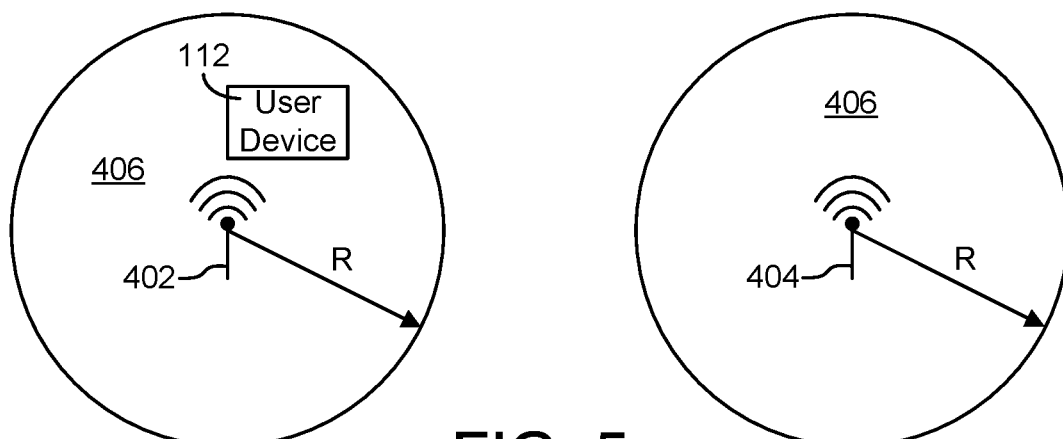
Figure 6:
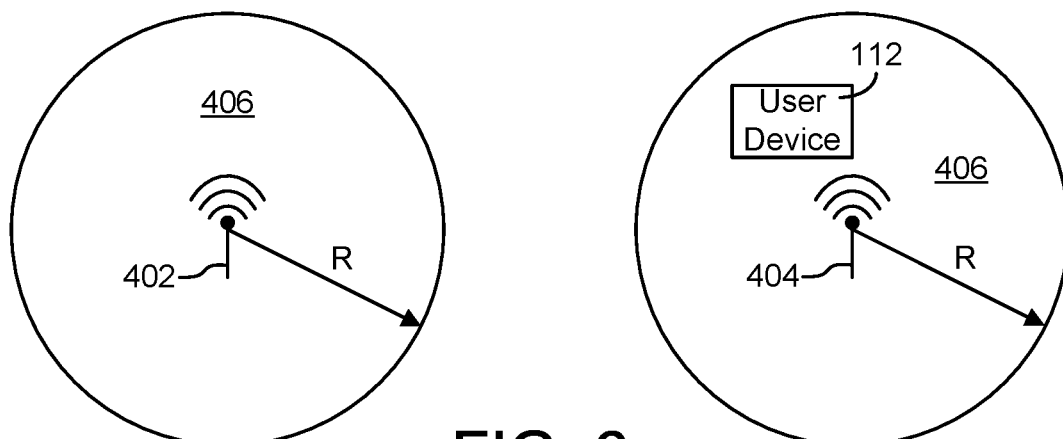

Referring to FIGS. 4 through 6, three different scenarios involving two locator beacons 402 and 404 and a user device 112 are described. In the following scenarios, the first beacon 402 is positioned near an ATM of the financial institution 102 and the second beacon 404 is positioned in a branch lobby of the financial institution 102. Although shown as having substantially the same broadcast radius R, each of the beacons 402 and 404 may be configured to have different broadcast radii by increasing or decreasing the broadcast transmission power. Additionally, the shape of the broadcast region 406 for each of the beacons 402 and 404 may be shaped into a noncircular shape by placing a shield (e.g., a material that is impermeable to radio frequency transmissions) around designated portions of the beacons 402 and 404. The beacon's broadcast regions 406 are shown as being substantially the same for ease of describing the following scenarios. As described in further detail below, depending on the received beacon identifier (or lack thereof), an application of the financial institution 102 that is being executed by the user device 112 may present a different user interface and/or require a different level of authentication (e.g., the amount of acceptable risk may vary depending on the type of transaction associated with the identified location).

Referring to FIG. 4, the user device 112 is not within range of either of the beacons 402 and 404. As shown, the user device 112 is positioned outside of the broadcast regions 406 for each of the beacons 402 and 404. Accordingly, the user device 112 does not receive a unique identifier from either beacon 402 or beacon 404. If the user accesses the financial institution application being executed by the user device 112, the user is taken to the standard home screen of the application (e.g., a normal logon interface, the previous interface left open by the user, etc.). The standard home screen is associated with a first authentication level. In some arrangements, the first authentication level requires the user to enter a username and a password to gain access to the user's account information via the financial institution application. The first authentication level may require additional information, such as providing a biometric, the entering of a PIN, answering a security question, or a combination thereof.

Referring to FIG. 5, the user device 112 is within the range of the first beacon 402 and not the second beacon 404. Since the user device 112 is in the broadcast region 406 of the first beacon 402, the user device 112 receives the unique identifier of the first beacon 402 (e.g., a unique identification number). The financial institution application being executed by the user device 112 transmits the received unique identifier to the backend system 106 of the financial institution 102. The backend system 106 returns a location-specific interface to the application. As noted above, the first beacon 402 geo-fences an ATM. Accordingly, the location-specific interface relates to the ATM. Additionally, the backend system 106 returns a second authentication level to the application. In some arrangements, the second authentication level is different than the first authentication level. For example, to access the location-specific interface relating to the ATM, the user may be required to enter the user's account PIN instead of having to enter both a username and password. The second authentication level may be associated with all ATMs operated by the financial institution 102. In other arrangements, the authentication level associated with the first beacon 402 varies based on a user history. For example, in some arrangements, the backend system 106 stores user history information (e.g., which ATMs/branches the user visits, how often the user visits certain areas, visit patterns, etc.). In such arrangements, if the ATM associated with the first beacon 402 is an ATM the user typically visits, the second authentication level may be lower than the first authentication level. If the ATM associated with the first beacon 402 is an ATM the user does not typically visit, the second authentication level may be the same or higher than the first authentication level.

Referring to FIG. 6, the user device 112 is within the range of the second beacon 404 and not the first beacon 402.

Since the user device 112 is in the broadcast region 406 of the second beacon 404, the user device 112 receives the unique identifier of the second beacon 404 (e.g., a unique identification number). The financial institution application being executed by the user device 112 transmits the received unique identifier to the backend system 106 of the financial institution 102. The backend system 106 returns a location-specific interface to the application. As noted above, the second beacon 404 geo-fences a branch lobby area of the physical location 104. Accordingly, the location-specific interface relates to the physical location 104 (e.g., services offered at that particular location, hours, employees, etc.). Additionally, the backend system 106 returns a third authentication level to the application. In some arrangements, the third authentication level is different than the first and second authentication levels. For example, to access the location-specific interface relating to the physical location 104, the user may not be required to enter authentication information because the presented user interface merely provides information relating to the physical location 104 instead of allowing the user to perform or prestage transactions. The third authentication level may be associated with all branch lobbies operated by the financial institution 102. In other arrangements, the authentication level associated with the second beacon 404 varies based on a user history in a similar manner as discussed above.

Still referring to FIG. 6, in some arrangements, the backend system 106 also transmits user information to the financial institution computing devices 108. For example, the financial institution computing devices 108 may include a tablet computing device used by a greeter of the financial institution (e.g., an employee that welcomes customers as they enter the lobby of the physical location). In such arrangements, the backend system 106 may transmit a picture of the user and the user's name associated with the user device 112 to the table computing device used by the greeter such that the greeter can greet the customer by name as they enter the lobby. The same information may be transmitted to computing devices used by tellers employed at the physical location 104. Providing this information to the employees of the financial institution 102 provides a more personalized service to the customers of the financial institution 102.

Figure 7:
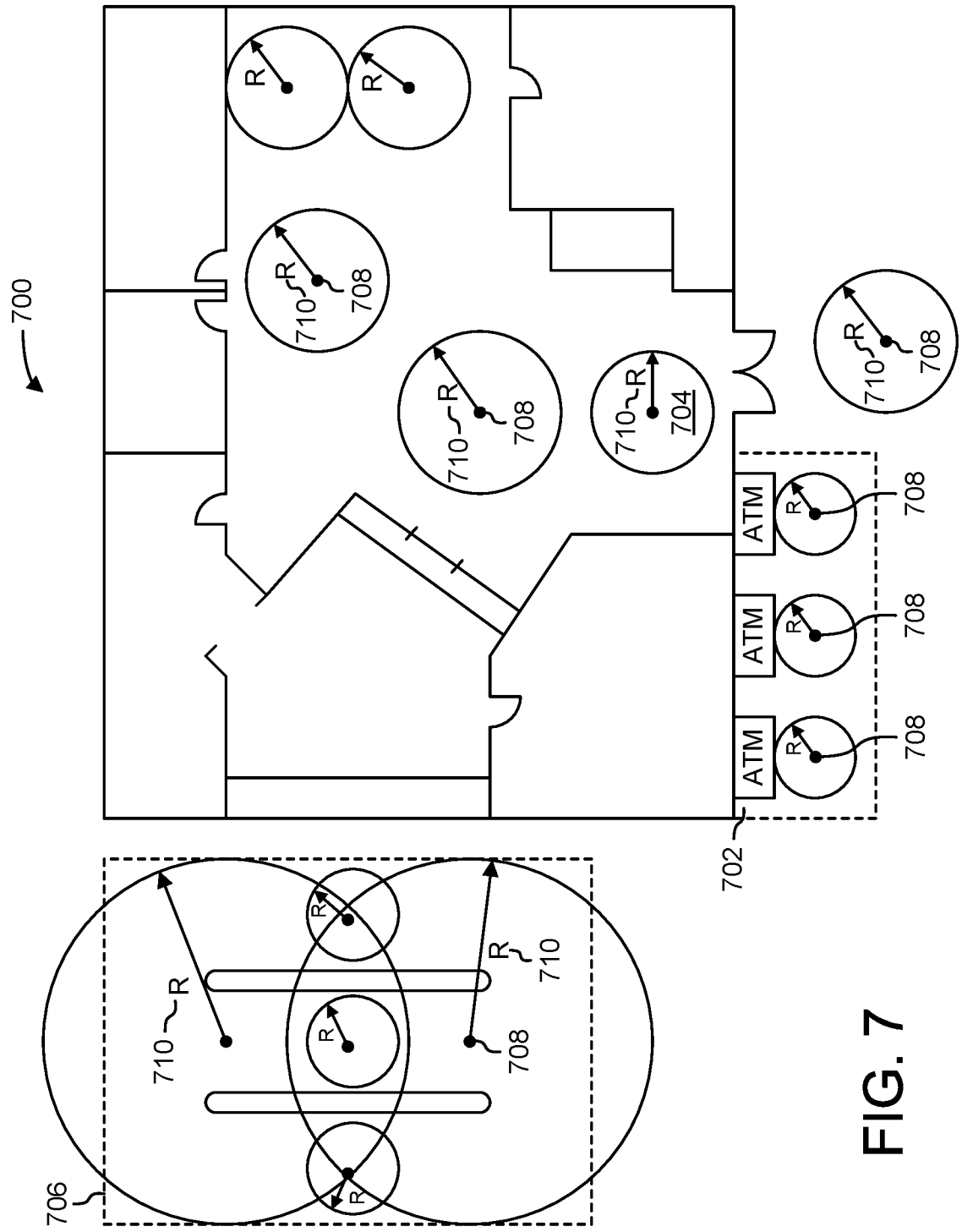
FIG. 7 is an overhead view of a bank branch according to an exemplary embodiment.

Referring to FIG. 7, an overhead view of a bank branch 700 is shown according to an exemplary embodiment. The bank branch 700 may be the physical location 104 of the financial institution 102 as described above. The bank branch 700 includes a plurality of different customer areas, including an ATM area 702, a lobby area 704, and a drive-through area 706. Each customer area is geo-fenced with at least one beacon 708. Each beacon 708 is similar to any of beacons 114, 402, or 404 in structure and function. Each of the beacons 708 has a broadcast radius 710. The broadcast radius 710 of each of the beacons 708 may be varied (e.g., by varying the broadcast power of each beacon) and shapes (e.g., by using signal shaping shields). In some arrangements, the broadcast radii 710 of multiple beacons 708 overlap (e.g., as shown in the drive-through area 706). In other arrangements, the broadcast radii 710 of multiple beacons 708 do not overlap (e.g., as shown in the ATM area 702). As described above, based on the received beacon identification of a customer device (e.g., user device 112) a different user interface is presented to a user of the customer device.

Each customer area may be subdivided into multiple subareas. For example, each ATM within the ATM area 702 may be associated with an individual beacon (e.g., one beacon 710 for each ATM— three beacons for three ATMs as shown in FIG. 7). Similarly, each drive-through lane in the drive-through area 702 may be associated with an individual beacon 710. Additionally, beacons may be placed upstream of the areas to detect customers approaching the areas. For example, beacons may be placed on the driveway leading up to the drive-through area 702 to detect customers approaching the drive-through area. Similarly, beacons may be placed outside of the lobby area 704 (e.g., in the parking lot of the bank branch 700) to detect customers approaching the lobby area 704.

Customers of the bank branch 700 may carry portable computing devices (e.g., user device 112) that are executing a bank application (e.g., as discussed above). Depending on where the portable computing devices are within the bank branch 700 (e.g., where the customer is located if the customer is carrying the portable computing device), the bank application presents different interfaces to the customer and/or requires a different level of authentication before allowing the customer to interact with the bank application.

Referring to FIG. 8, a flow diagram of a method 800 of updating an application interface based on a detected location of a user device (e.g., user device 112) within a geo-fenced area of a financial institution (e.g., physical location 104, bank branch 700, etc.) according to an exemplary embodiment. The flow diagram details the interaction between the user device (left-most column), a backend system of a financial institution (e.g., backend system 106), and financial institution devices (right-most column), such as computing devices (e.g., computing devices 108) and beacons (e.g., beacons 114, 402, 404, and 710).

Beacon identifiers are broadcast at 802. The beacon identifiers are broadcast by beacons positioned within (e.g., in the lobby, in an ATM area, etc.) and outside of (e.g., in a drive-through area, in the parking lot, etc.) of a financial institution. Each beacon wirelessly broadcasts a unique beacon identifier (e.g., a serial number) to a distance of a broadcast radius of the beacon. Each beacon is associated with an area and geo-fences that area with the broadcasted identifier. Accordingly, the location of devices in receipt of the beacon identifier is known to be within the broadcast range of the beacon associated with the identifier. The beacons broadcast the unique identifiers via wireless radio frequency (e.g., Bluetooth, Blootooth Low Energy, etc.).

Method 800 continues at 804 when a user device receives a beacon identifier. The beacon identifier is received at a processor of the user device via a wireless receiver (e.g., a Bluetooth transceiver, network interface 208, etc.). The received beacon identifier is transmitted at 806. The beacon identifier is transmitted by the processor and via the wireless receiver to the backend system. The beacon identifier may be transmitted from the user device to the backend system through the Internet.

The beacon identifier is received from the user device at the backend system at 808. The beacon identifier is received at a processor of the backend system via a network interface of the backend system. The backend system compares the received beacon identifier to known beacon identifiers. In some arrangements, the known beacon identifiers are stored in a database on the backend system. Each entry in the database associates a beacon identifier to a specific location. The specific location may be any of a branch location, an ATM location, or another physical location (e.g., a billboard or an advertisement, an auto dealership that has a working relationship with the financial institution, etc.). Each beacon identifier is associated with a user interface and an authentication level. The backend system determines the location of the user device to be a determined location from a plurality of locations. Each of the plurality of locations is associated with a user interface and an authentication level.

The user interface and authentication level are determined at 810. The banking application running on the user device can be configured with different user interfaces depending on the location of the user device. For example, if the user is entering an ATM area or drive-through area of a bank, the user interface may relate to an interface that allows the user to prestage an ATM transaction while the user waits in line. As an additional example, if the user is approaching the bank from the parking lot, the user interface may relate to the branch hours, the branch services, a listing of employees that are currently working at the branch, and the like. Different user authentication requirements may be tied to different interfaces. The user must satisfy the specified authentication requirement prior to providing access to the user interface. For example, in order to prestage a transaction, a user is required to provide a first level of authentication, and in order to view the branch services, hours, and employee list, the user is required to provide a second level of authentication. The first level of authentication is higher (e.g., more stringent and requires more user information) than the second level of authentication. The specific level of authentication may be based on a level of risk associated with the available transactions in the given user interface.

The user interfaces (e.g., button layout, menus, and the like) are stored at the backend system not on the user device. Storing the user interfaces on the backend system allows the backend system to push needed user interfaces, which requires fewer application updates and a smaller amount of available memory on the user device than if the application were preloaded with the entire library of user interfaces. Accordingly, the backend system transmits the user interface and authentication level to the user device at 812. The user interface and authentication level are received at the user device at 814.

In some arrangements, the backend system transmits user information to at least one financial institution device at 816. The user information includes a user name, a user nickname, a user description, the types of accounts associated with the user, user family information, or a combination thereof. The user information is received at the financial institution device at 818. The financial institution device is a computing device accessible by employees at the financial institution. For example, in some arrangements, the backend system transmits a picture of a user that is approaching a bank branch and the user's name to a tablet computer operated by a greeter at the bank branch such that the greeter can identify the user walking in and greet the user by name.

Up to 818, the above-described steps may take place without any user interaction with the user device (other than carrying the user device into range of a beacon). The bank application running on the user device interacts with the backend system and the financial institution beacons to receive a beacon ID at 804, to transmit the beacon ID at 806, and to receive the user interface and the authentication information at 814 without any user input. For example, a user can leave her smartphone (that is running the bank application) in her purse as she enters a bank branch, and the backend system can still transmit her information to the greeter at the bank branch such that the greeter can greet the user by name.

Method 800 continues when the user provides authentication information at 820. The user provides the authentication information via a user input of the user device. The authentication information includes any of a password, a PIN, a user ID, an answer to a verification question, a biometric (e.g., a picture of the user's face, a fingerprint, a voice sample, a retina scan, etc.), an identification of a security image, or a combination thereof. In some arrangements, no user authentication information is required. For example, the user interface pushed by the backend system based on the user's location does not allow the user to initiate any transactions or view any account information, so no password or user ID entry is required to view the user interface. In some arrangements, at least a portion of the authentication information is provided in the form of a customer token and/or a device token stored on the user device. The customer token and device token may be tokens that identify the user and the associated user device to the backend system in the future. The tokens are initially created by and encrypted by the backend system and then transmitted to the user device. The tokens may be created as part of installing the financial institution application on the user device. After the tokens are created and stored on the user device, the tokens may be used to supplement or as a substitute for manually entered authentication provided by the user via the user device. In an example embodiment, each time the user accesses the backend system with a new user device, the new user device is assigned its own device token. A device and customer token are stored on each device in order to bind the device to the user (one user device can only have financial institution user associated with it, but one user can have multiple user devices). Once a user device is registered with the user, the user may be required to manually enter less information during an authentication process than if the tokens are not present on the user device. For example, the user may have an online banking password consisting of a combination of eight or ten or more characters including numbers, upper and lower case characters, punctuation marks, and so on. Rather than enter the full online banking password, the user may only need to enter their existing ATM PIN, device password, or other information to be authenticated via the registered device. Possession by the user of the registered user device provides an additional level of authentication that avoids the need for full login credentials.

The authentication information is transmitted from the user device to the backend system at 822. The backend system authenticates the user at 824. The back end system compares the received authentication information with stored and verified authentication information relating to the user. If the provided authentication information does not match, the backend system sends a notification to the user device indicating the information does not match. In these situations, the user may be prompted to reenter authentication information (e.g., method 800 reverts back to 820). If the provided authentication information matches the verified authentication information, the backend system transmits an authentication decision to the user device at 826. The authentication decision signals to the user device that the user is permitted to access the user interface associated with the beacon identifier.

After receiving the authentication decision, the user device renders the user interface 828. The user interface is a location-specific user interface that presents different options depending on the location. As discussed above, the user interface may relate to an interface that allows the user to prestage an ATM transaction while the user waits in line in an ATM area. The user interface may relate to the branch information including branch hours, the branch services, a listing of employees that are currently working at the branch, and the like. The user interface may relate to more information about an advertisement in proximity to the user.

Method 800 is repeated as the user moves throughout the branch. Accordingly, if a second beacon identifier is received at the user device and transmitted to the backend system, a second user interface and second authentication level is transmitted back to the device. The method 800 repeats for each new beacon identifier received by the user device.

The above-described systems and methods can be used to push different user interfaces based on a device being detected at non-bank branch locations. For example, a beacon can be embedded in an advertisement at a store (e.g., an auto financing advertisement at a car dealership), and the application can provide customer specific information relating to the advertisement (e.g., interest rates available to the customer based on the customer's accounts with the financial institution). As another example, a beacon can be placed near a billboard that advertises a mortgage refinancing option offered by the financial institution. In the example, the backend system can push a user interface that includes customer-specific data relating to how much the customer can save by refinancing with the advertised product.

The above-described systems and methods can also be used with other location-specific identifiers. For example, a customer can program the customer's home wireless network SSID into the banking application such that whenever the customer is connected to the network having the SSID, the banking application can have a decreased level of authentication and/or a customized home user interface. Other location-specific identifiers can be based on wireless network SSIDs, GPS coordinates, GLONASS coordinates Although the above-described systems and methods are described with respect to a financial institution, such as a bank, the same or similar systems and methods may be employed with any type of business that has a physical location (e.g., a store, an advertisement, etc.).

The above systems and methods may be used for authentication and cross-authentication of any number of parties involved in any number of transactions. Additionally, the above systems and methods may be used to provide authentication of individuals and/or entities independent of any pending transactions between the individuals and/or entities.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the designing of the operating conditions and arrangement of the embodiments without departing from the scope of the present invention.

What is claimed is:

1. A method of remotely configuring a banking application based on a detected location of a computing device running the banking application, the method comprising:
   receiving, by a processor of a banking system, a beacon identifier relating to a location of the computing device;
   determining, by the processor, the location of the computing device based on the beacon identifier, the beacon identifier associated with a determined location of a plurality of locations, wherein the determined location is associated with a first authentication level that requires authentication information relating to a user of the computing device;
   determining, by the processor, security requirements based on the beacon identifier;
   determining, by the processor, at least one authentication level corresponding to the security requirements;
   determining, by the processor, if user authentication is required based on the at least one authentication level;
   responsive to determining that user authentication is required based on the at least one authentication level, receiving, by the processor, authentication information relating to the user;
   authenticating, by the processor, the user to access information corresponding to the at least one authentication level;
   transmitting, by the processor, an authentication decision to the computing device, the authentication decision instructing the computing device that the user is permitted to access information corresponding to the at least one authentication level; and
   displaying, by the processor, the information corresponding to the at least one authentication level.

2. The method of claim 1, wherein the at least one authentication level includes the first authentication level and a second authentication level, wherein the first authentication level and the second authentication level are different.

3. The method of claim 1, further comprising creating, by the processor, a token identifying the user and the computing device to be stored on the computing device,
   wherein the authentication information comprises the token.

4. The method of claim 1, further comprising:
   failing to authenticate, by the processor, the user to access a graphical user interface associated with the determined location based on the received authentication information;
   transmitting, by the processor, a second authentication decision to the computing device, the second authentication decision instructing the computing device that the user is not permitted to access the graphical user interface; and
   continuing to display, by the processor, the information about the determined location.

5. The method of claim 1, wherein the at least one authentication level is based on a user history received from a backend system, the user history comprising at least one of a user visit frequency, a list of visited branch locations, or visit patterns.

6. The method of claim 1, further comprising receiving, by the processor, a prestaged transaction request, wherein the prestaged transaction request is received from the computing device via a graphical user interface.

7. The method of claim 1, further comprising:
   receiving, by the processor, a second beacon identifier relating to a second location of the computing device;
   determining, by the processor, the second location of the computing device based on the second beacon identifier, the second beacon identifier associated with a second determined location of the plurality of locations; and
   transmitting, by the processor, a second graphical user interface associated with the second determined location.

8. A non-transitory computer readable media having computer-executable instructions embodied therein that, when executed by a computing system, causes the computing system to perform operations comprising:
   receiving a beacon identifier relating to a location of a computing device;
   determining the location of the computing device based on the beacon identifier, the beacon identifier associated with a determined location of a plurality of locations, wherein the determined location is associated with a first authentication level that requires authentication information relating to a user of the computing device;
   determining security requirements based on the beacon identifier;
   determining at least one authentication level corresponding to the security requirements;
   determining if user authentication is required based on at least one authentication level;
   responsive to determining that user authentication is required based on the at least one authentication level, receiving authentication information relating to the user;

authenticating the user to access information corresponding to the at least one authentication level;

transmitting an authentication decision to the computing device, the authentication decision instructing the computing device that the user is permitted to access information corresponding to the at least one authentication level; and displaying the information correspond to the at least one authentication level.

9. The non-transitory computer readable media of claim 8, wherein the at least one authentication level includes the first authentication level and a second authentication level, wherein the first authentication level and the second authentication level are different.

10. The non-transitory computer readable media of claim 8, the operations further comprising creating a token identifying the user and the computing device to be stored on the computing device,
wherein the authentication information comprises the token.

11. The non-transitory computer readable media of claim 8, the operations further comprising:
failing to authenticate the user to access a graphical user interface associated with the determined location based on the received authentication information;
transmitting a second authentication decision to the computing device, the second authentication decision instructing the computing device that the user is not permitted to access the graphical user interface; and
continuing to display the information about the determined location.

12. The non-transitory computer readable media of claim 8, wherein the at least one authentication level is based on a user history received from a backend system, the user history comprising at least one of a user visit frequency, a list of visited branch locations, or visit patterns.

13. The non-transitory computer readable media of claim 8, the operations further comprising receiving a prestaged transaction request, wherein the prestaged transaction request is received from the computing device via a graphical user interface.

14. The non-transitory computer readable media of claim 8, the operations further comprising:
receiving a second beacon identifier relating to a second location of the computing device;
determining the second location of the computing device based on the second beacon identifier, the second beacon identifier associated with a second determined location of the plurality of locations; and
transmitting a second graphical user interface associated with the second determined location.

15. A banking system comprising:
a plurality of beacons each configured to transmit a different unique beacon identifier, each of the plurality of beacons associated with a location of a plurality of locations of a bank branch;
a backend system comprising a processor, the processor configured to:
receive a beacon identifier relating to a location of a computing device;
determine the location of the computing device based on the beacon identifier, the beacon identifier associated with a beacon of the plurality of beacons, wherein a determined location is associated with a first authentication level that requires authentication information relating to a user of the computing device;
determine security requirements based on the beacon identifier;
determine at least one authentication level corresponding to the security requirements;
determine if user authentication is required based on the at least one authentication level;
responsive to a determination that user authentication is required based on the at least one authentication level, receive authentication information relating to the user;
authenticate the user to access information corresponding to the at least one authentication level;
transmit an authentication decision to the computing device, the authentication decision instructing the computing device that the user is permitted to access information corresponding to the at least one authentication level; and
display the information corresponding to the at least one authentication level.

16. The system of claim 15, wherein the at least one authentication level includes the first authentication level and a second authentication level, wherein the first authentication level and the second authentication level are different.

17. The system of claim 15, the processor further configured to:
fail to authenticate the user to access a graphical user interface associated with the determined location based on the received authentication information;
transmit a second authentication decision to the computing device, the second authentication decision instructing the computing device that the user is not permitted to access the graphical user interface; and
continue to display the information about the determined location.

18. The system of claim 15, wherein the at least one authentication level is based on a user history received from the backend system, the user history comprising at least one of a user visit frequency, a list of visited branch locations, or visit patterns.

19. The system of claim 15, the processor further configured to receive a prestaged transaction request, wherein the prestaged transaction request is received from the computing device via a graphical user interface.

20. The system of claim 15, the processor further configured to:
receive a second beacon identifier relating to a second location of the computing device;
determine the second location of the computing device based on the second beacon identifier, the second beacon identifier associated with a second determined location of the plurality of locations; and
transmit a second graphical user interface associated with the second determined location.

* * * * *